(12) United States Patent
McConnell

(10) Patent No.: US 9,028,196 B2
(45) Date of Patent: May 12, 2015

(54) TRAVELER ROLLER

(75) Inventor: Ralph Edward McConnell, Chattanooga, TN (US)

(73) Assignee: Miller Industries Towing Equipment, Inc., Ooltewah, IN (US)

(*) Notice: Subject to any disclaimer, the term of this patent is extended or adjusted under 35 U.S.C. 154(b) by 462 days.

(21) Appl. No.: 13/565,100

(22) Filed: Aug. 2, 2012

(65) Prior Publication Data

US 2014/0037411 A1  Feb. 6, 2014

(51) Int. Cl.
*B60P 3/12* (2006.01)
*B60P 1/54* (2006.01)

(52) U.S. Cl.
CPC ............. *B60P 1/5433* (2013.01); *B60P 1/5457* (2013.01); *B60P 3/12* (2013.01)

(58) Field of Classification Search
CPC .. F16C 29/0619; B60P 1/5438; B60P 1/5457; B60P 1/5461; B60P 1/5466; B60P 3/12; B60P 3/122
USPC .......................................... 414/543; 212/224
See application file for complete search history.

(56) References Cited

U.S. PATENT DOCUMENTS

| | | | |
|---|---|---|---|
| 1,438,228 A | | 12/1922 | Ertz |
| 2,644,691 A | * | 7/1953 | Pohle ............................ 280/28.5 |
| 3,144,135 A | * | 8/1964 | Brown .......................... 212/299 |
| 3,190,703 A | * | 6/1965 | Thomson et al. ............... 384/44 |
| 3,301,416 A | | 1/1967 | Bopp |
| 3,501,031 A | * | 3/1970 | Whitfield ...................... 414/543 |
| 3,567,295 A | * | 3/1971 | Wilkes ............................ 384/44 |
| 3,784,035 A | * | 1/1974 | Dunbar ......................... 414/543 |
| 3,836,211 A | * | 9/1974 | Pfister-Schneeberger ...... 384/44 |
| 3,964,802 A | * | 6/1976 | Pitner ............................. 384/44 |
| 4,249,853 A | * | 2/1981 | Lyvers .......................... 414/543 |
| 4,583,793 A | * | 4/1986 | Blatter ............................ 384/44 |
| 4,599,032 A | * | 7/1986 | Haus, Jr. ....................... 414/542 |
| 4,607,893 A | * | 8/1986 | Damico .......................... 384/45 |
| 4,662,763 A | * | 5/1987 | Itoh ................................ 384/45 |

(Continued)

FOREIGN PATENT DOCUMENTS

| | | | | |
|---|---|---|---|---|
| EP | 463858 A1 | * | 1/1992 | .............. F16C 29/06 |
| GB | 403082 A | * | 12/1933 | .......... F16C 29/0619 |
| GB | 2077697 A | * | 12/1981 | ................ B60P 3/12 |

OTHER PUBLICATIONS

International Search Report and the Written Opinion of the International Searching Authority, or Declaration.

(Continued)

*Primary Examiner* — James Keenan
(74) *Attorney, Agent, or Firm* — Michael P. Mazza, LLC

(57) ABSTRACT

A recovery vehicle for recovering other, disabled vehicles, and a method for doing so. A vehicle frame extends along a longitudinal axis, and supports a travel base assembly carrying a boom. The travel base assembly can move along the longitudinal axis of the frame. Two or more traveler rollers may be located between the vehicle frame and the travel base assembly, for supporting the travel base assembly and facilitating longitudinal movement of the travel base assembly relative to the vehicle frame. The traveler rollers may include a plurality of rollers movable about a load-bearing member. Using the invention, a load may be lifted by the boom and moved between positions located at the rear and to the side of the recovery vehicle, without the need to first reposition the boom using boom lift or telescoping cylinders.

12 Claims, 8 Drawing Sheets

(56) References Cited

U.S. PATENT DOCUMENTS

| | | | | |
|---|---|---|---|---|
| 4,666,316 | A | * | 5/1987 | Stark ................................ 384/44 |
| 4,790,710 | A | * | 12/1988 | Ayalon ........................... 414/563 |
| 6,092,975 | A | | 7/2000 | Cannon, Jr. |
| 6,279,309 | B1 | * | 8/2001 | Lawlor et al. .................... 60/772 |
| 7,111,744 | B2 | * | 9/2006 | Brannan et al. ................ 212/180 |
| 2004/0223670 | A1 | * | 11/2004 | Ramonat et al. ................. 384/45 |
| 2011/0058758 | A1 | * | 3/2011 | Menges et al. .................. 384/45 |

OTHER PUBLICATIONS

Hilman Rollers; www.hilmanrollers.com; The Company Profile.
Thomason RoundWay Linear Roller Bearings; website: www.thomsonballbushing.com.
NRC photos and general specifications.

\* cited by examiner

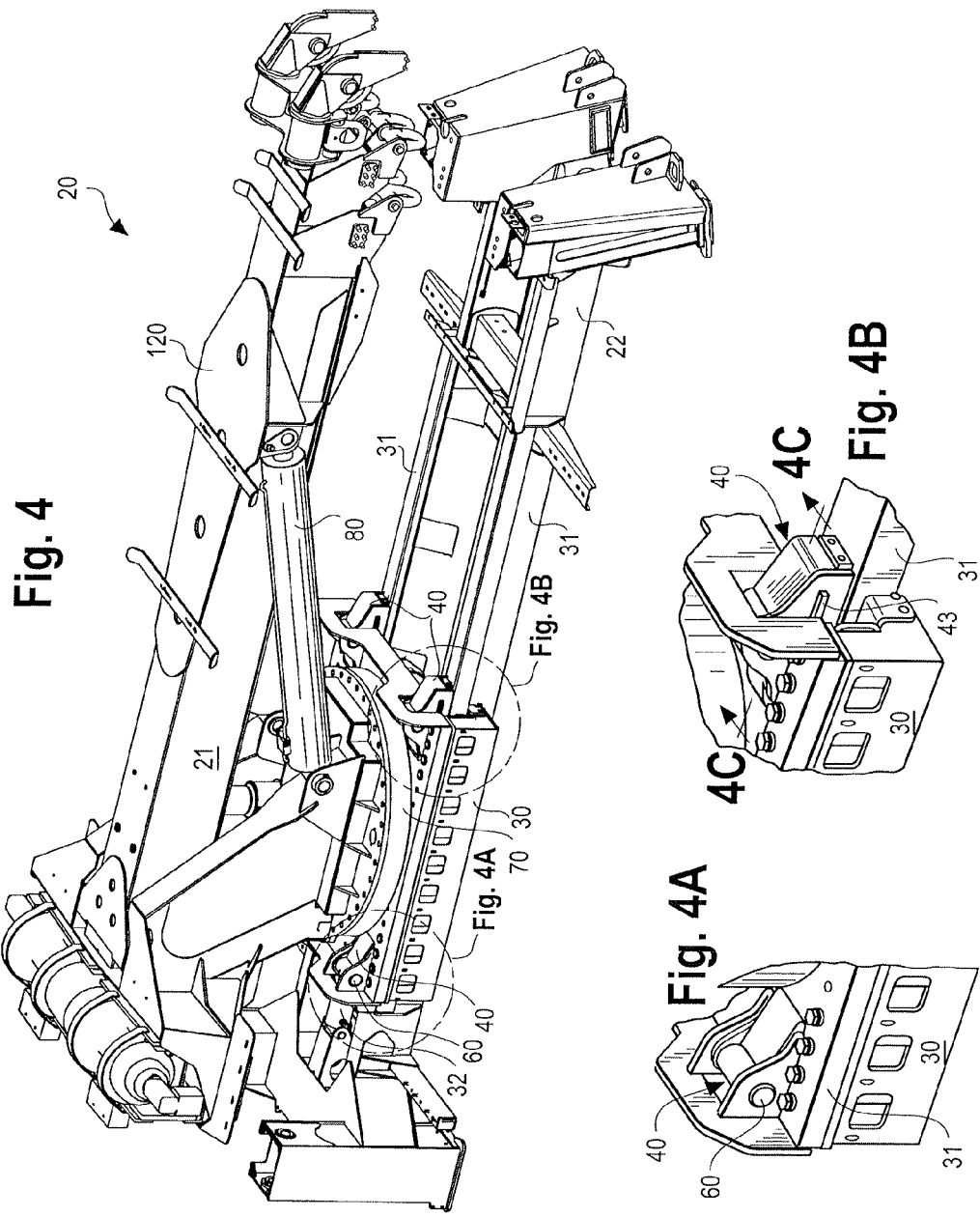

TRAVELER ROLLER

BACKGROUND OF THE INVENTION

The present invention generally relates to vehicle recovery devices with masts and booms ("vehicle wreckers"), including those that can be rotated ("rotating wreckers"), as well as those which cannot be rotated, and whose supporting travel base can be moved along the longitudinal axis of the wrecker, to increase the reach of the boom. Such vehicle wreckers allow a load to be lifted and then moved a given distance forward or rearward along the wrecker longitudinal axis.

With prior art vehicle wreckers such as the NRC Slider and the Miller XLT Traveler, the wrecker mast and boom move along travel frame tubes on Nylatron® or bronze bearing pads. A drawback to this type of system, the former of which has been used for more than 20 years, is that it is affected greatly by the combination of the load applied to the boom, the size of the travel cylinder, and the resulting friction between the bearing pads and the travel tubes. With these prior art systems, lubrication between the bearing pads and the travel tubes is critical. As the load increases on the boom, the need for lubrication increases. Also, as the load on the boom increases, the ability to maintain sufficient lubrication between the bearing pads and travel tubes becomes increasingly more difficult. Operators utilize personal preferences for lubrication choices. The lubricants used range from differing types of grease, to paraffin-based automotive undercoating, both applied with a brush, to spray-on motorcycle chain grease. No matter which lubricant is used, they only work for a short period of time. Whether it is the lubricant being wiped off in use, dried by the sun or washed off by weather, they all have a short lifespan. In many cases, if the travel tubes are not lubricated before a load is applied to the boom, it is impossible to move the load. In this case, the load must be lowered and disconnected so that the travel tubes can be properly lubricated. The load may then be reconnected, and the travel function operated. This problem seems to be something that most operators have resigned themselves to and live with.

Over the years, various attempts have been made to solve these problems. The size of the travel cylinder was increased, which provided some advantage. Installing an automatic greasing system was tried, to eliminate the need to climb onto the machine and brush grease on the travel tube. This system appeared to work in theory, but was not usable in reality. Different bearing materials have been tried, and attempts have been made to come up with other ways to distribute the loads over a larger area; however, no advantageous solution was found.

During brainstorming sessions, the concept of using a wheel instead of bearing pads was discussed. This would eliminate the friction that the bearing pad sees, but wheels have their own drawbacks. Unlike bearing pads with a larger area to distribute the load, wheels have only a small contact line along the width of the wheel. This will cause high compressive loads along this contact line. To compensate for this, additional wheels may be added which will help, but will not completely solve the load distribution problem. If enough wheels can be added, the next problem is to design an axle that is large enough to carry the load without bending. However, these designs yielded systems that were too large to fit into the given area available. In sum, there is agreement within the industry that a solution to these problems would be advantageous.

In addition to solving the above-mentioned problems, there is also a need to provide a vehicle wrecker having certain advantages. For example, there is a need to provide a vehicle wrecker with a movable travel base to provide increased reach and working area for the mast and boom. There is also a need to provide a vehicle wrecker with the ability to lift a heavy load close to the rear of the wrecker, and then move it a distance away from the rear of the wrecker without having to reposition the boom. There is a further need to provide a vehicle wrecker with the ability to lift a heavy load at the rear of the wrecker, and then rotate it around the rear corner of the wrecker without the need for repositioning the boom. There is also a need to provide a vehicle wrecker than can lift a load on one side of the wrecker and then travel to the rear, rotate the load around the rear corners of the wrecker, and then travel forward without the need to reposition the boom. Still further, there is a need to provide a vehicle wrecker with an increased lifting capacity such that the wrecker, by traveling the load toward or away from the rear of the wrecker, can move the boom into a better position to lift at its rate range. Additionally, there is a need to increase the lifting capacity of a vehicle wrecker by enabling movement of the load toward the rear of the wrecker, thus moving the counterweight of the engine further away from the load being lifted.

SUMMARY OF THE INVENTION

The objects mentioned above, as well as other objects, are solved by the present invention, which overcomes disadvantages of prior wreckers, while providing new advantages not previously associated with them.

In a preferred embodiment of the invention, a recovery vehicle is provided for recovering other, disabled vehicles. The vehicle includes a vehicle frame extending along a longitudinal axis. The vehicle frame supports a travel base assembly carrying a boom, and the travel base assembly is capable of moving along the longitudinal axis of the frame. A plurality of traveler rollers are located between the vehicle frame and the travel base assembly. The traveler rollers support the travel base assembly and facilitate longitudinal movement of the travel base assembly relative to the vehicle frame. Each of the traveler rollers include a plurality of rollers movable about a load-bearing member.

In a particularly preferred embodiment, the individual rollers of each traveler roller may be linked by a chain assembly. One or more of the traveler rollers may be capable of pivoting relative to the travel tube assembly. The boom may, but need not be capable of rotating about an axis generally perpendicular to the longitudinal frame axis.

In one preferred embodiment, the travel base assembly may include four traveler rollers generally situated at the ends of the travel base assembly. The vehicle frame may include a travel cylinder which is a motive force for the travel base assembly. To facilitate this travel, the vehicle frame may support travel tubes, with the traveler rollers riding along the travel tubes. Also to facilitate this travel, bottom and side bearing pads may be located between the travel tubes and the travel base assembly.

In a preferred embodiment, a rotating bearing wheel may be provided and supported by the travel base assembly. The rotating bearing wheel may carry the boom, enabling rotation of the boom about a vertical axis substantially perpendicular to the longitudinal axis of the frame. The boom may be extendible and retractable, and may be pivoted about a horizontal axis substantially parallel to the longitudinal axis of the frame.

A method for using a recovery vehicle to recover other, disabled vehicles, also forms a part of the present invention. With this method, a vehicle frame may be provided. The vehicle frame may extend along a longitudinal axis, and may support a travel base assembly carrying a boom with one or more lift cylinders. Preferably, the boom can extend or retract, and the travel base assembly is capable of moving along the longitudinal axis of the frame.

In one embodiment, the travel base assembly may support a non-rotating boom. In another embodiment, the travel base assembly may support a rotating platform/bearing carrying the boom and allowing the boom to be rotated about a vertical axis substantially perpendicular to the longitudinal axis of the frame. With either embodiment, two or more traveler rollers may be located between the vehicle frame and the travel base assembly. The traveler rollers may support the travel base assembly and facilitate longitudinal movement of the travel base assembly relative to the vehicle frame. Each of the traveler rollers preferably includes a plurality of rollers movable about a load-bearing member. Now, using the boom, a load may be lifted from a position adjacent a rear of the recovery vehicle to a position adjacent a side of the recovery vehicle, or from a position adjacent a side of the recovery vehicle to a position adjacent a rear of the recovery vehicle, without actuating the lift cylinder of the boom and without extending or retracting the boom. Using the invention, a load may also be lifted from a position adjacent a front of the recovery vehicle to a position adjacent a side of the recovery vehicle, or vice versa, although this may require actuating the lift cylinder of the boom and/or extending or retracting the boom.

Definition of Claims Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 4 is a top and side perspective view of a preferred embodiment of a rotating wrecker of the present invention, using traveler rollers for moving the travel base assembly;

FIG. 4A is an enlarge view of the similarly labeled, circled portion on FIG. 4;

FIG. 4B is an enlarged view of the similarly labeled, circled portion on FIG. 4.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
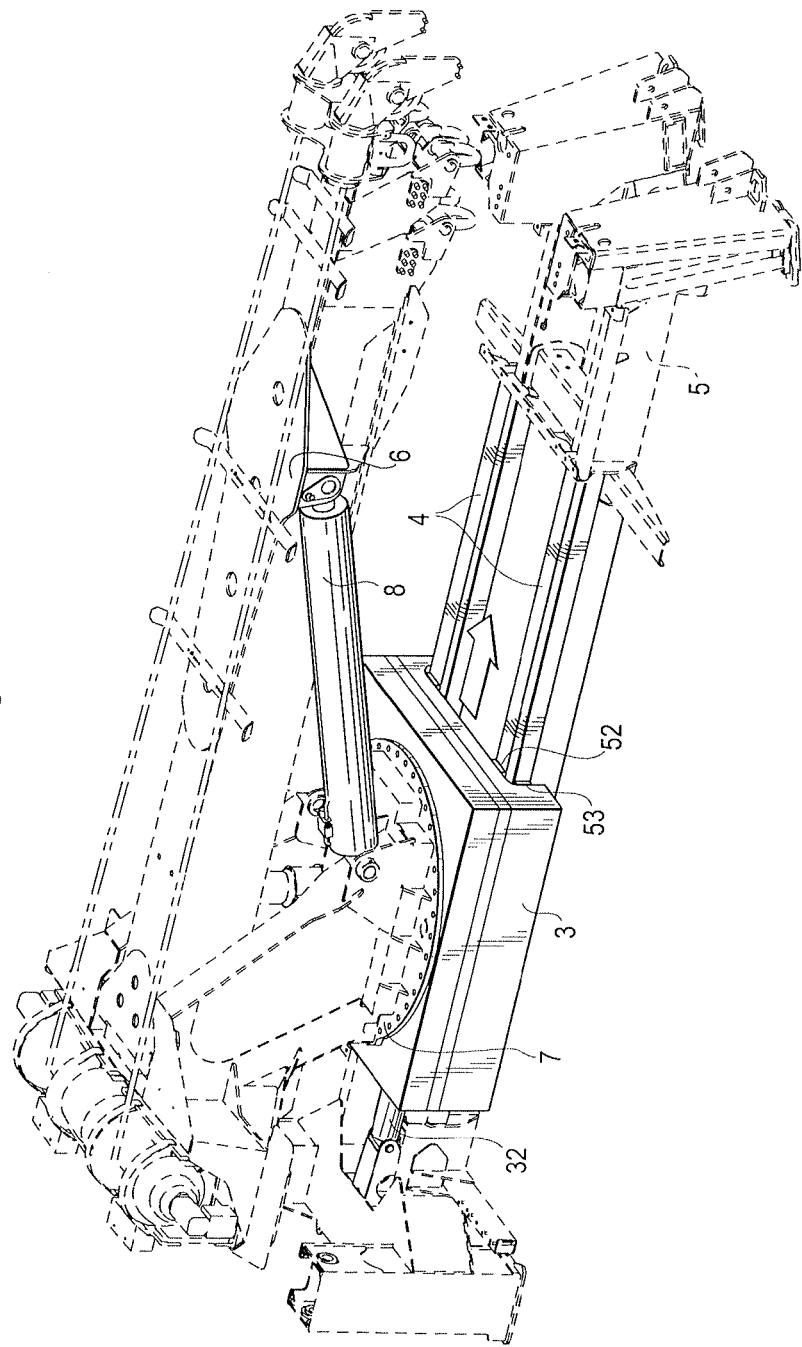
FIG. 1 is a top and side perspective view of a prior art rotating wrecker using a conventional system for moving the travel base assembly along the longitudinal axis of the wrecker.
Figure 2:
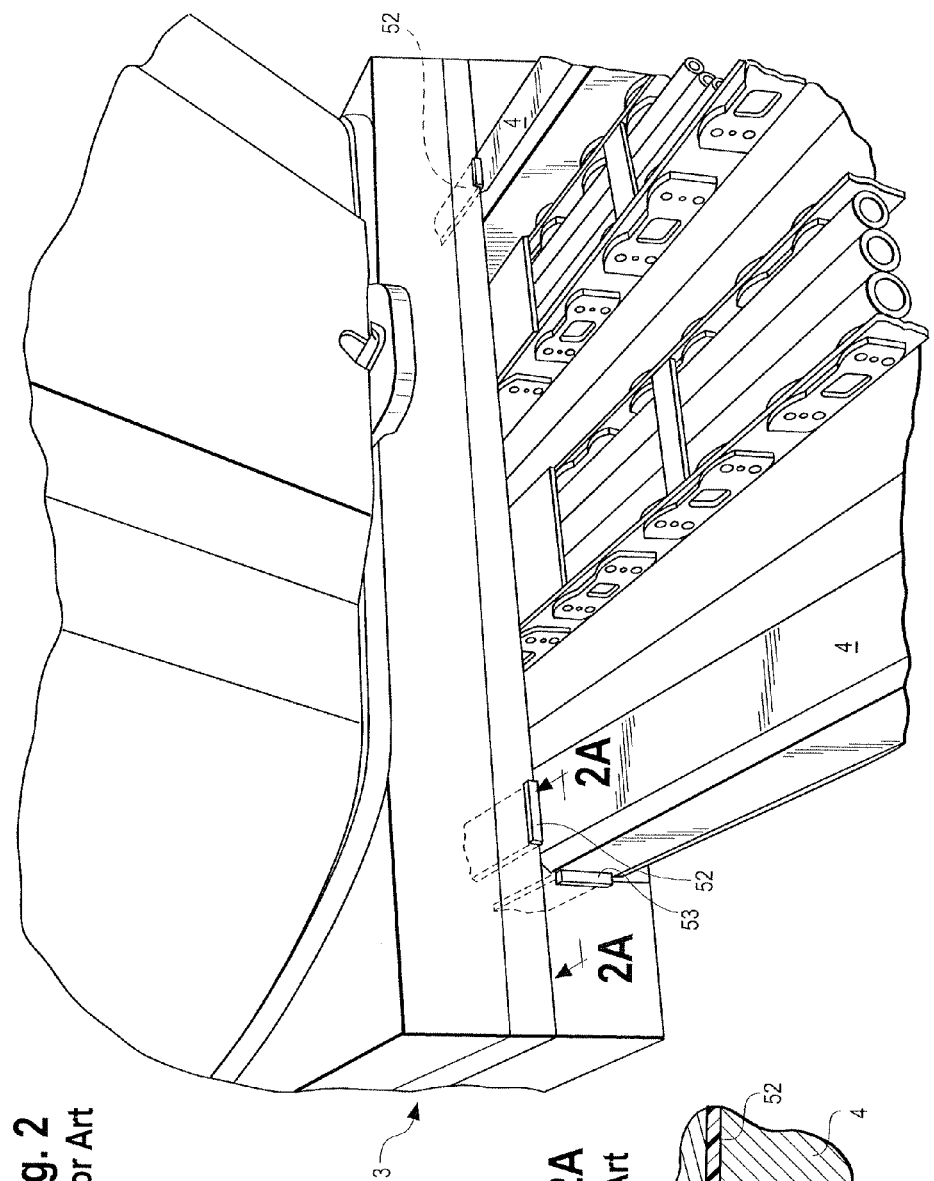
FIG. 2 is a top and front perspective view of a front portion of the travel base assembly for a rotating wrecker that is in the prior art.
Figure 2A:
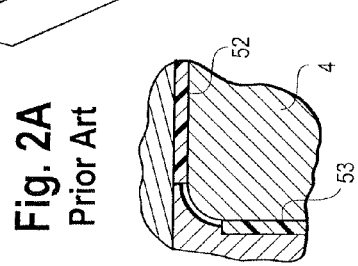
FIG. 2A is an enlarged view along reference line 2A-2A of FIG. 2.

Referring now to prior art FIGS. 1-2, rotating wrecker 10 includes a wrecker assembly 6 mounted on rotating bearing 7, which is in turned mounted on travel base assembly 3. Travel base assembly 3 moves over travel tubes 4 along the longitudinal axis of the rotating wrecker. Referring to FIG. 2, between travel base assembly 3 and travel tubes 4, bearing pads, including top bearing pad 52, side bearing pads 53, and a bottom bearing pad (not shown), may be located, and lubricated, to facilitate movement of the travel base assembly over travel tubes 4.

Referring now to a preferred embodiment of the present invention shown in FIGS. 3A-3E, the wrecker operator has various functions at his disposal to move the boom. Thus, boom lift cylinder 80 raises and lowers boom 120. Boom 120 may also be extended or retracted by telescoping cylinders (not shown). Travel cylinder 32 (FIG. 4) may be actuated to move travel assembly 30, carrying the boom, in a direction along the longitudinal axis of the vehicle frame. Finally, rotation of rotating bearing 70 may also allow boom 120 to be rotated. Extendible stabilizing legs 130 (FIG. 3A) may be used to stabilize the wrecker during recovery operations.

Figure 3:
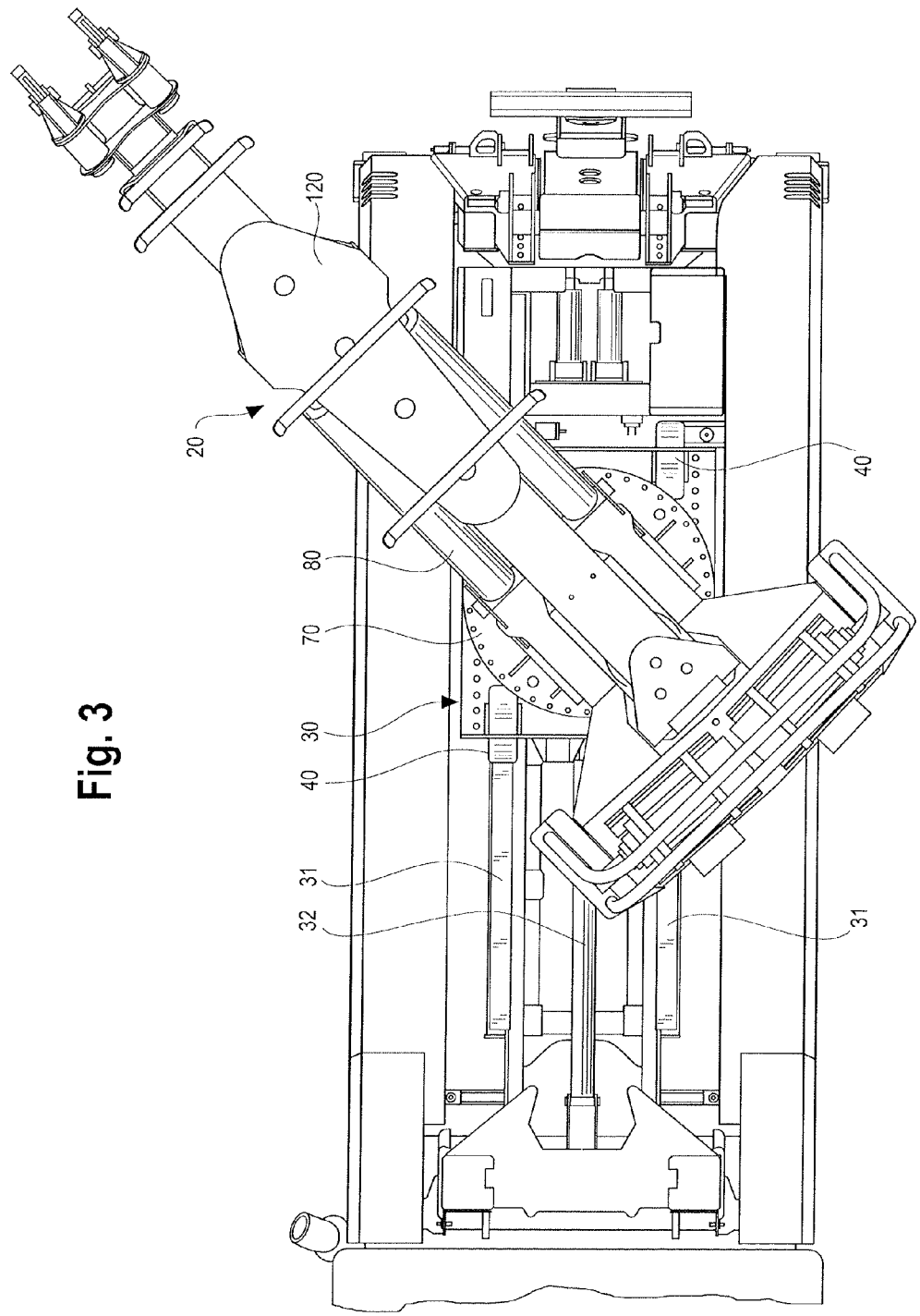
FIG. 3 is a top view of a preferred embodiment of a rotating wrecker according to the present invention.
Figure 3A:
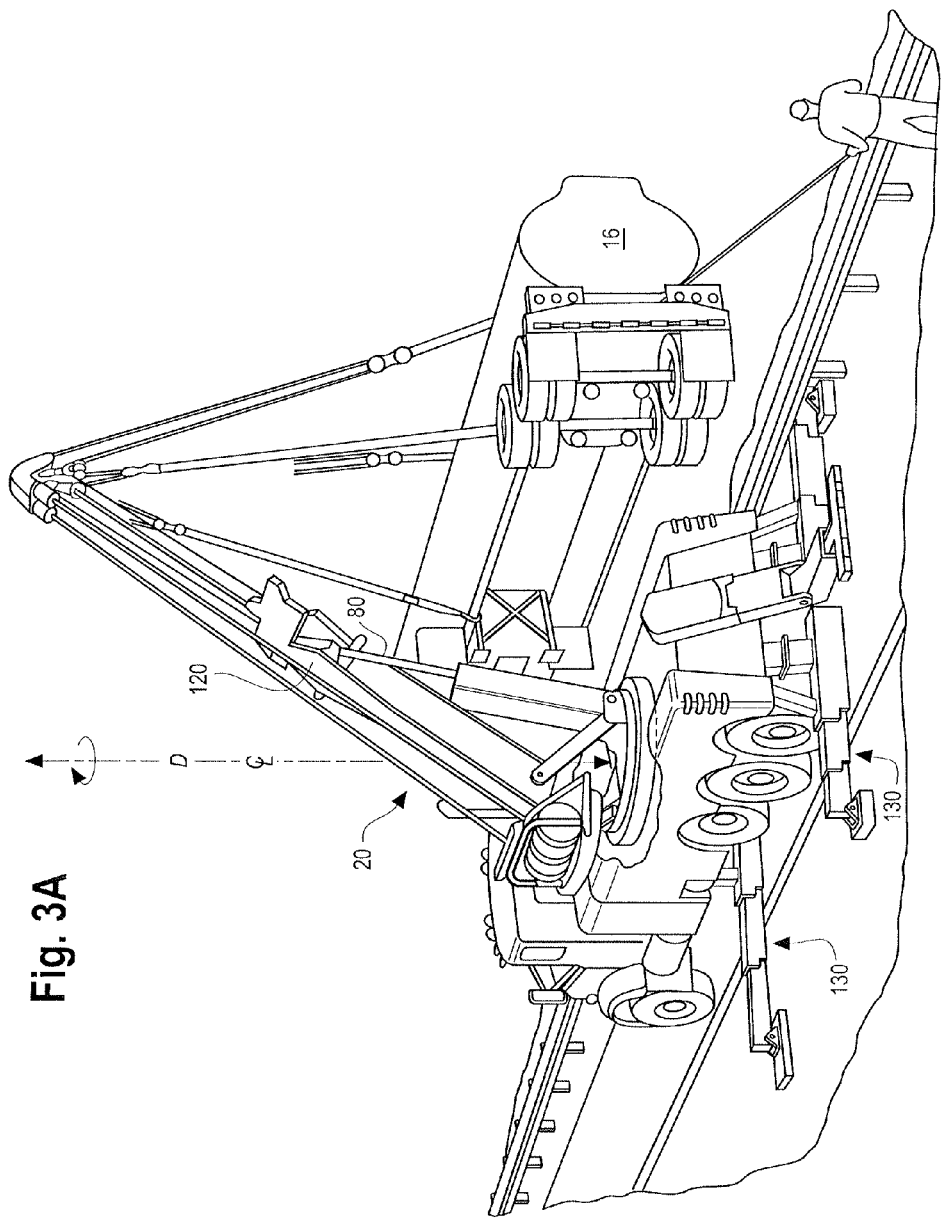
FIG. 3A is a side and rear perspective view of rotating wrecker according to the present invention, in the act of recovering a disabled tanker.
Figure 3B:
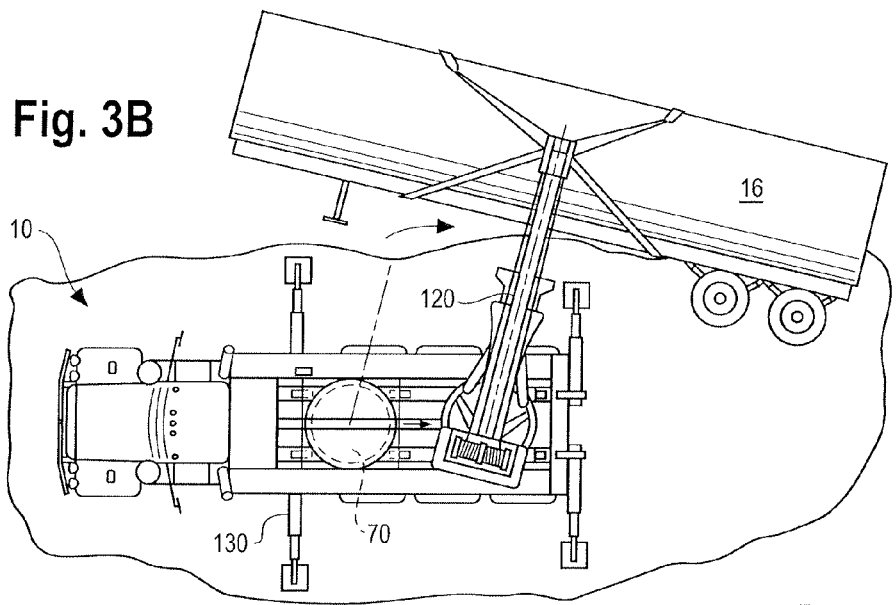
FIG. 3B is a top perspective view with the tanker in a similar position, adjacent the right-side of the wrecker, as with FIG. 3A.
Figure 3C:
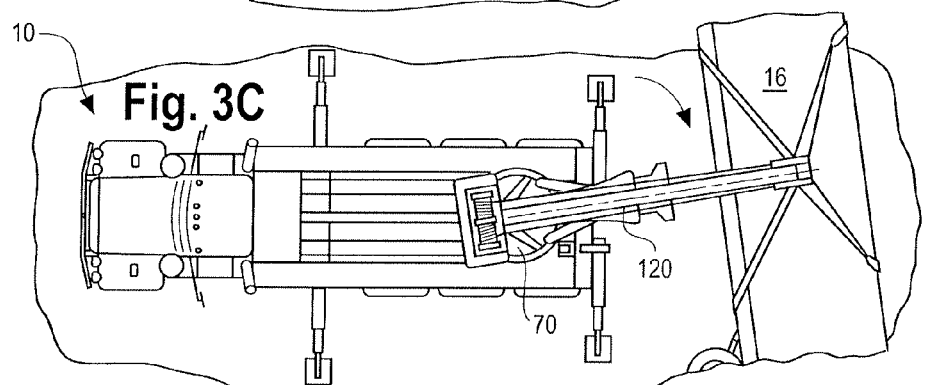
FIGS. 3C-3D are top perspective views showing the tanker moved to the rear, and then to a position adjacent the left-side of the wrecker (based on the boom rotating about vertical axis/reference line D/E), respectively.
Figure 3D:
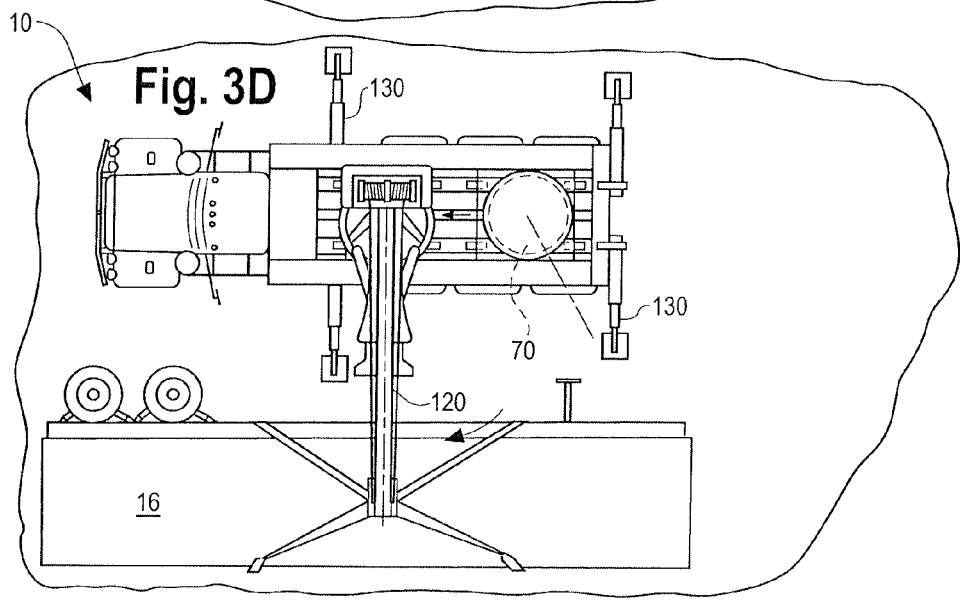
Figure 3E:
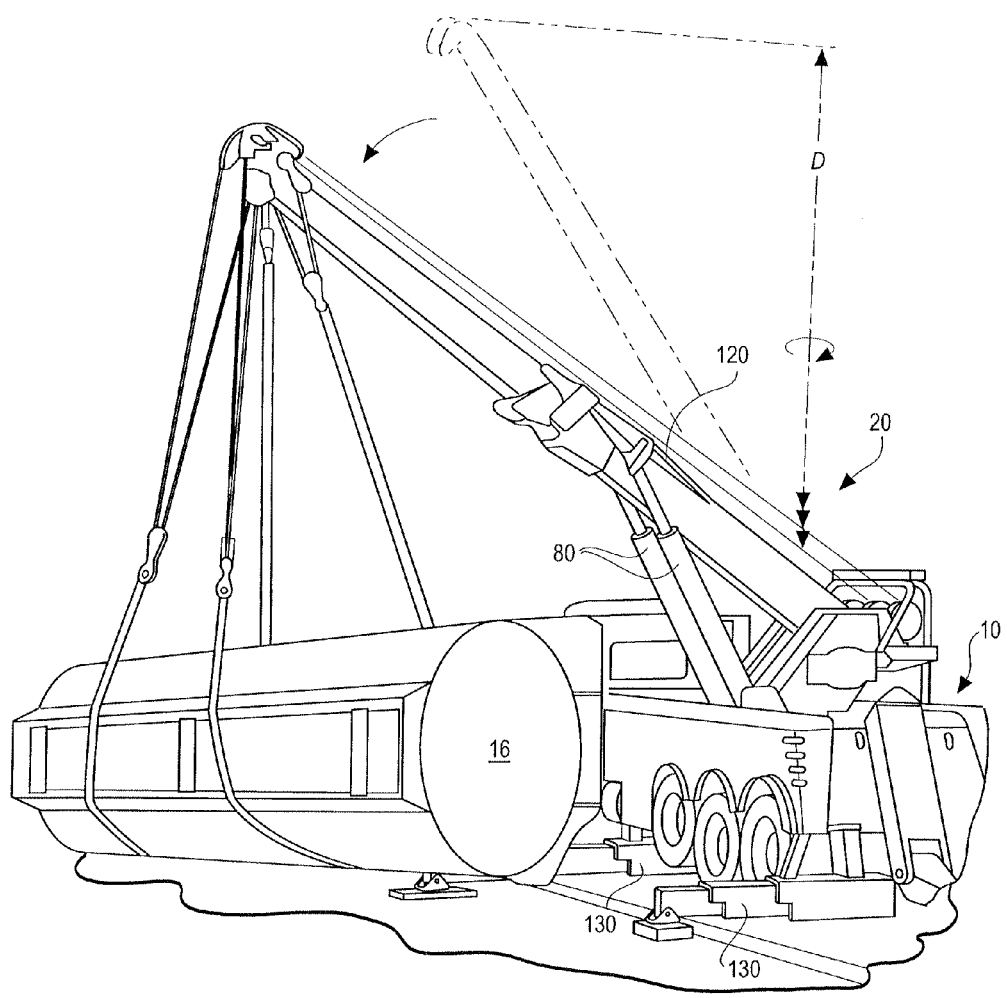
FIG. 3E is a side and rear perspective view of the rotating wrecker of the shown in FIGS. 3A-3D, with the wrecker in the position shown in FIG. 3D.

FIGS. 3A-3E illustrate a wrecker operation lifting sequence in which the present invention may be used to move a load (tanker 16) from a position adjacent the right-side of the wrecker (FIGS. 3A-3B) to a position rear of the wrecker (FIG. 3C), and then to a position adjacent the left-side of the wrecker (FIGS. 3D-3E). Most preferably, this lifting sequence may be accomplished without the need to actuate the boom lift or telescoping/retracting cylinder (i.e., the lifting sequence may be accomplished simply by boom rotation together with movement of the travel assembly longitudinally).

As a further example, with the envisioned Miller 50-ton rotating wrecker, the travel assembly will be able to move about 5 feet in the direction of the longitudinal axis along the vehicle frame. This travel distance provides the wrecker operator with a greater degree of operational flexibility, so that a wrecker can recover a disabled vehicle, as shown in FIGS. 3A-3E, without the need to reposition the boom (i.e., without the need to actuate either the boom lift cylinder, or to actuate the cylinder for telescoping or retracting the boom), thereby minimizing or eliminating the need for boom repositioning and/or moving the vehicle. By allowing the wrecker operator to perform a recovery operation without needing to reposition the boom by actuating the lift cylinder or extending or retracting the boom, this can increase the speed of recovery, and simplify the wrecker operation, providing enhanced safety. (Given the wrecker dimensions relative to the boom location, recovery of a load positioned in front of the wrecker may require actuation of the boom lift cylinder and/or extension/retraction of the boom.)

Figure 4C:
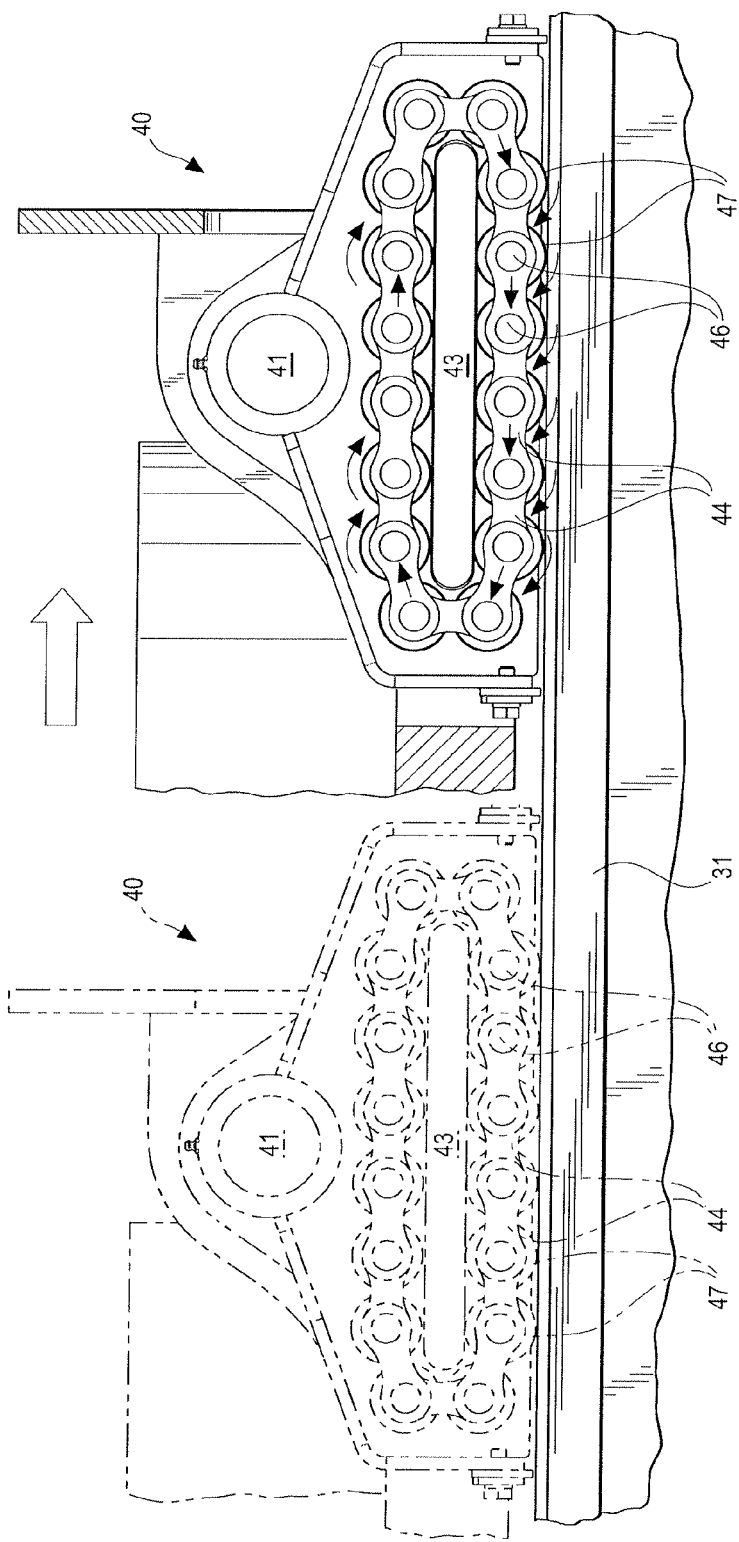
FIG. 4C is a side perspective view of the roller assemblies shown in FIG. 4, with the arrows illustrating the direction of the rotation of the individual rollers.

By way of further background concerning the present invention, and referring now to FIG. 4C, the roller technology disclosed here utilizes an endless recirculating chain of steel rollers 47 capable of rotating about a center, load-bearing steel plate 43. Rollers 47 perform as a low friction, high capacity conveyor. The load may be transferred directly through rollers 47 positioned between load-bearing plate 43 and travel tubes 31. The rollers may be sized in diameter, length and the number of rollers contacting the travel tubes to fit the load which they are rated to carry. This roller technology is a modern version of the ancient method of using a length of round pipe or rod to roll a heavy load on. One end of the load is lifted so that the first piece of pipe can be placed under its edge. As the load is rolled along on the first piece of pipe, additional pipes are placed in front of the load so it will continue rolling along. As the pipes roll out at the rear of the load, they are then moved ahead of the load so that there always are pipes for the load to continue to move on. The weight of the load is transferred directly through the pipe to the ground. The total weight of the load is distributed over a number of rollers. Using the invention, there is no concern about an axle failing. With the recirculating rollers, there is always a roller being laid down in front of the load automatically. Roller assemblies of the type used here, sized appropriately, may be obtained from companies such as Hilman Rollers of Marlboro, N.J., or Danaher Corporation, which sells the Thomson® RoundWay Linear Bearings.

Referring now to FIG. 4, the rotating wrecker of the present invention is generally referenced by reference numeral 20. The roller assemblies of the present invention are generally referenced by numeral 40, and may be used to replace the top bearing pads 52 shown in FIG. 2 that see the highest resulting loads. Roller assemblies 40 may be attached at pivot pins 60 to travel frame 30, which in turn supports wrecker assembly 21. Wrecker assembly 21 may include telescoping boom 120, which may be moved up or down using lift cylinder 80. Wrecker assembly 21 may revolve about rotating bearing 70, which may be carried by travel base assembly 30.

Pivot 60 between roller assemblies 40 and travel base 30 allows rollers 47 to remain in constant contact with travel tubes 31 if there is any misalignment between the two. In the preferred embodiment, roller assemblies 40 ride on top of travel tubes 31. Travel tubes 31 may be attached to wrecker subframe weldment 22. A travel cylinder 32 may be attached between wrecker subframe 22 and travel frame 30 to move wrecker frame 21 along the longitudinal axis of the wrecker.

Referring to FIG. 4C, rollers 47 may be connected through a series of links 44 that keep the rollers 47 moving together and spaced evenly. This type of system will eliminate almost all effects of friction between travel tubes 31 and travel assembly 30 (FIG. 4). By replacing the upper bearing pads seeing the highest loads with the roller system, the critical need for lubrication between the moving surfaces is greatly reduced, if not eliminated altogether.

To compensate for the varied capacity ratings of different units offered, the roller assemblies can be altered in diameter, length and number of rollers. Such alterations may result in better distribution of the resultant load over a larger area, thus reducing the stress on individual rollers. The family of units used pursuant to this invention may be reduced or enlarged in size and complexity, and the roller system may be correspondingly adapted to meet the varying need for distributing the load.

The above description is not intended to limit the meaning of the words used in the following claims that define the invention. Persons of ordinary skill in the art will understand that a variety of other designs still filling within the scope of the following claims may be envisioned and used. For example, while preferred embodiments involving a rotating wrecker, have been disclosed, in other embodiments the wrecker mast and boom need not be capable of rotating. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A method for using a recovery vehicle comprising a wrecker to recover other, disabled vehicles, comprising the steps of:
providing the wrecker with a vehicle frame extending along a longitudinal axis, the vehicle frame supporting a travel base assembly carrying a boom with a lift cylinder, wherein the boom can extend or retract, the travel base assembly is capable of moving along the longitudinal axis of the frame, and the travel base assembly supports a rotating member allowing the boom to be rotated about a vertical axis substantially perpendicular to the longitudinal axis of the frame, and wherein the movements of the travel base assembly and the boom are used in recovering disabled vehicles;
providing two or more traveler rollers located between the vehicle frame and the travel base assembly for reducing frictional loads created during relative movement between the travel base assembly and the vehicle frame, the traveler rollers supporting the travel base assembly and facilitating longitudinal movement of the travel base assembly relative to the vehicle frame, each of the traveler rollers comprising a plurality of rollers linked by a chain assembly and movable about a load-bearing member and along the vehicle frame ;
using the boom, lifting a disabled vehicle.

2. The method of claim 1, wherein one or more of the traveler rollers is capable of pivoting relative to the travel base assembly.

3. The method of claim 1, wherein the travel base assembly includes four traveler rollers generally situated at ends of the travel base assembly.

4. The method of claim 1, wherein the vehicle frame includes at least one travel cylinder which supplies a motive force for the travel base assembly.

5. The method of claim 1, wherein the vehicle frame supports travel tubes, and wherein the traveler rollers ride along the travel tubes.

6. The method of claim 5, wherein bottom and side bearing pads are located between the travel tubes and the travel base assembly.

7. The method of claim 1, further comprising a rotating bearing supported by the travel base assembly and carrying the boom.

8. The method of claim 1, further comprising the step of pivoting the boom about a horizontal axis substantially parallel to the longitudinal axis of the frame.

9. The method of claim 1, wherein the disabled vehicle is moved from a position adjacent a rear of the wrecker to a position both rearwardly and substantially distant from the rear of the wrecker without actuating the lift cylinder of the boom and without extending or retracting the boom.

10. The method of claim 1, further comprising the steps of
 using the boom, lifting the disabled vehicle from a position adjacent a rear of the recovery vehicle to a position adjacent a side of the recovery vehicle, without actuating the lift cylinder of the boom, and without extending or retracting the boom.

11. The method of claim 1, wherein the boom is used to lift the disabled vehicle from a position adjacent a front of the recovery vehicle to a position adjacent a side of the recovery vehicle.

12. The method of claim 1, further comprising the step of using the boom to lift a disabled vehicle from a position adjacent a rear of the recovery vehicle to a position both rearwardly and substantially distant from the rear of the wrecker.

\* \* \* \* \*